UNITED STATES PATENT OFFICE.

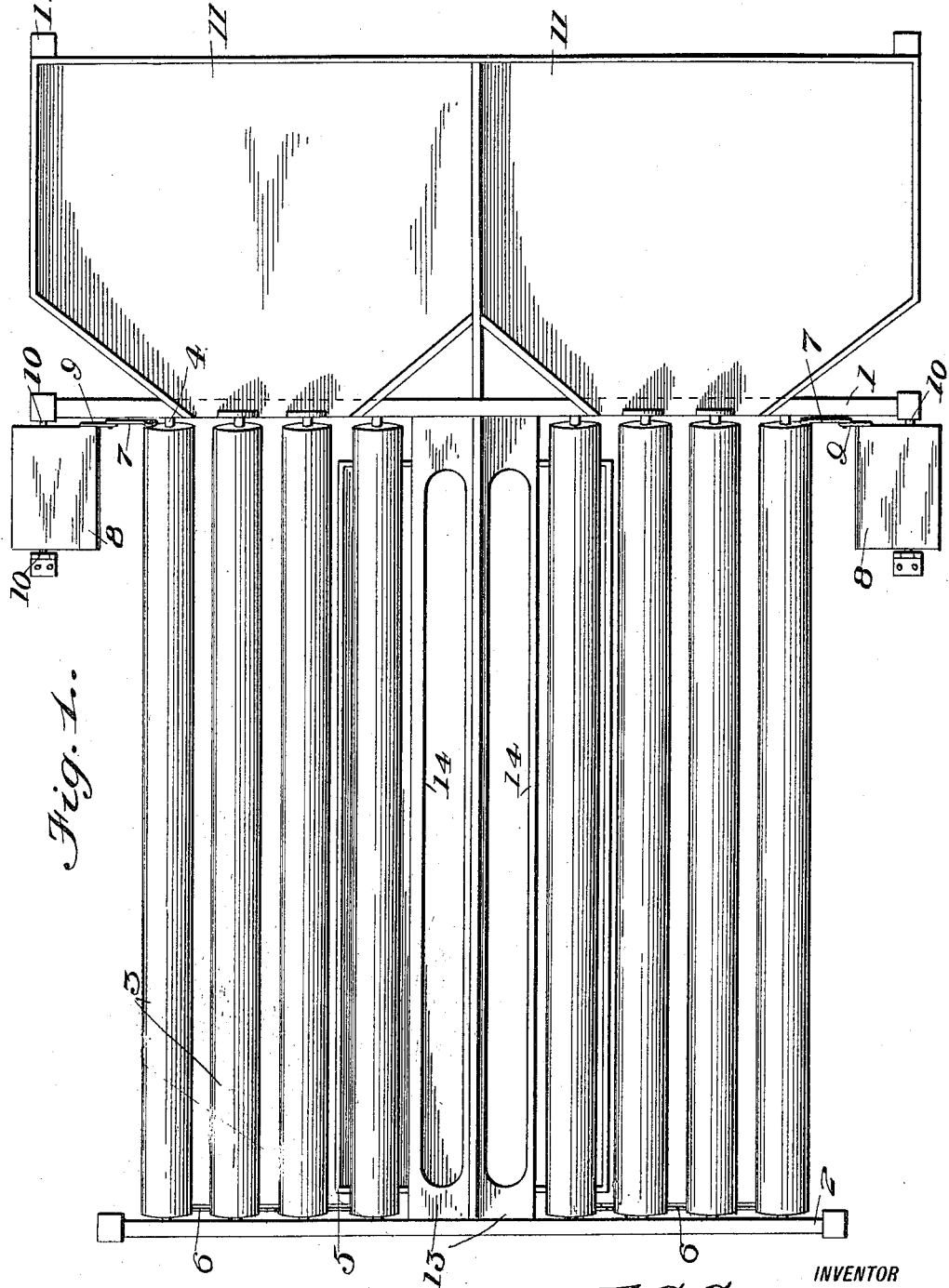

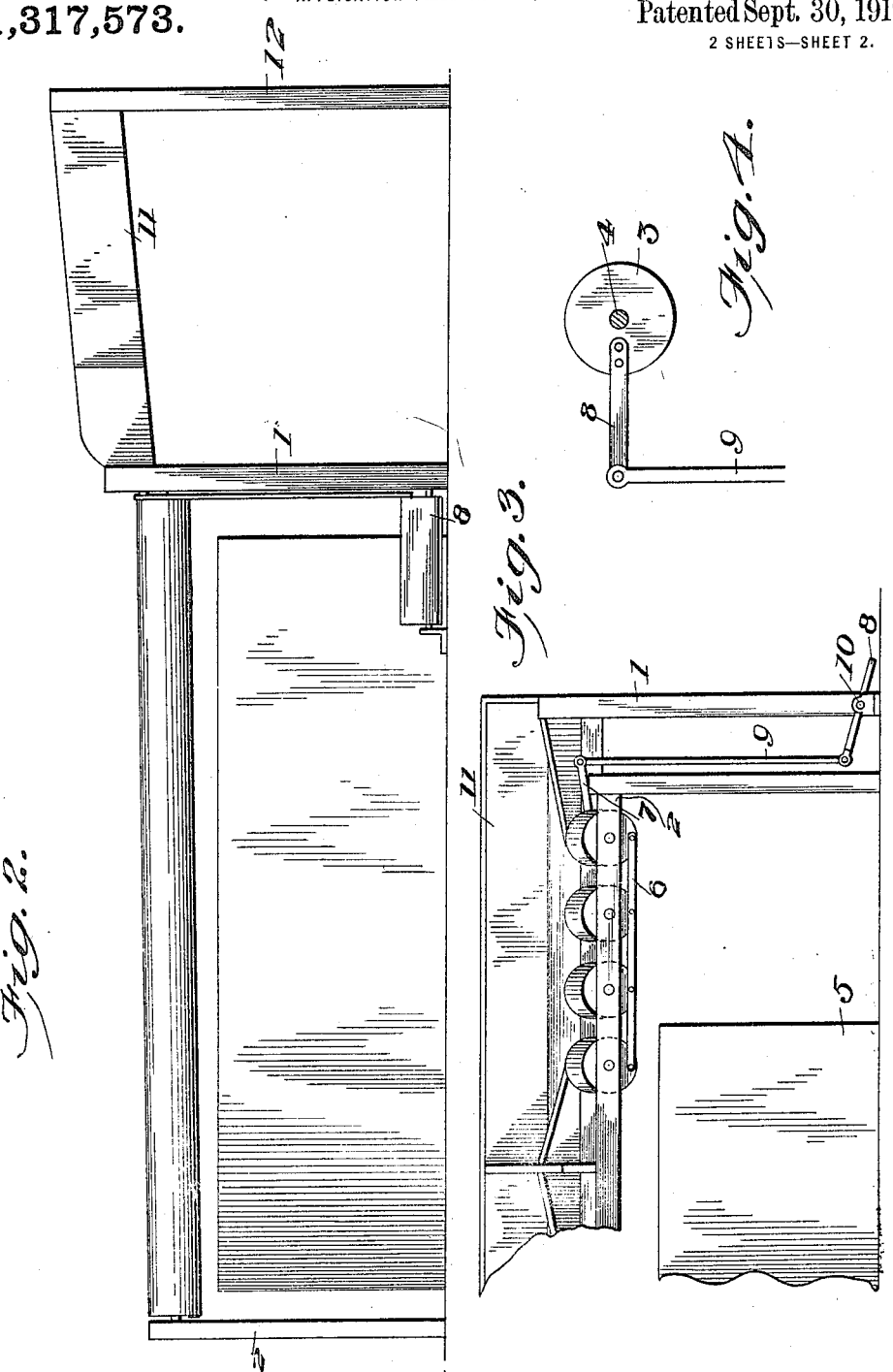

FYNIS C. GORDON, OF CASHMERE, WASHINGTON.

FRUIT-SORTING TABLE.

1,317,573.　　　　　Specification of Letters Patent.　　Patented Sept. 30, 1919.

Application filed April 19, 1919. Serial No. 291,323.

*To all whom it may concern:*

Be it known that I, FYNIS C. GORDON, a citizen of the United States, and a resident of Cashmere, in the county of Chelan and State of Washington, have invented certain new and useful Improvements in Fruit-Sorting Tables, of which the following is a specification.

My invention is an improvement in fruit sorting tables, and has for its object to provide a table of the character specified wherein a series of runways for fruit is formed by spaced rollers inclined to permit the fruit to roll down the same, the rollers being manually controlled to oscillate, to present different parts of the fruit to inspection.

In the drawings:

Figure 1 is a top plan view of the improved table;

Fig. 2 is a side view;

Fig. 3 is a partial end view;

Fig. 4 is an end view of one of the outer rollers showing the oscillating mechanism.

In the present embodiment of the invention, a suitable supporting frame is provided, consisting of end members 1 and 2, and a plurality of series of rollers 3 is journaled in the end members, each roller having journal pins 4 at its ends which engage bearings in the end members. These rollers are spaced apart from each other a sufficient distance to form runways for the fruit, and all the rollers are arranged in the same plane, the plane of the rollers inclining downwardly from the end member 1 to the end member 2.

In the present embodiment of the invention two series of rollers are provided, four rollers being arranged in each series, and the series are spaced apart by a bin 5, the bin extending between the end members 1 and 2. The rollers of each series are connected at the end adjacent to the end member 2 by a link 6, the said link being pivoted to each roller, the arrangement being such that all of the rollers of the series are constrained to oscillate together.

A radial arm 7 is secured to the outermost roller at the end adjacent to the frame 1, and with this arm is connected a treadle or foot plate 8 by means of a link 9. The foot plate is hinged, as indicated at 10, intermediate its ends, at the adjacent side of the end member 1, in convenient position for engagement by the foot of the operator. It will be evident that either set of rollers may be oscillated by means of the adjacent foot plate, to move all of the fruit which is supported by the series of rollers in the three runways between the same.

The fruit is fed to the runways of each series by means of a hopper or magazine 11. These hoppers or magazines are supported at one end by the end member 1 and at the other by standards 12, and the outlet ends of the magazines are reduced as shown in Fig. 1 to feed to the space between the series of rollers. Between the series of rollers is arranged a pair of plates 13, each plate having a longitudinally extending opening 14, through which culls may be dropped into the bin.

In operation, the fruit to be sorted is fed from the bins to the runways, and by means of the treadles the rollers are oscillated, to roll the fruit over and over, to present every part thereof to inspection as the fruit moves down the runways. The space between the rollers is too small to permit the fruit to drop through, and all of the fruit may be inspected without touching any of the same except the culls, which are dropped through the openings 14 into the bin.

Only the refuse passes through the space between the rollers, and the runways between the rollers are fed continuously from the bins or hoppers. It will be obvious that a single pair of rollers might be used, or as many as may be desired.

I claim:

1. A fruit sorting table comprising rollers arranged in spaced and parallel relation and forming between them runways for the fruit to be sorted, said rollers inclining downwardly from one end, means for simultaneously oscillating the rollers to move the fruit in the runways, and means for feeding fruit to the runways, said rollers being arranged in a plurality of series, with a bin for culls between the series.

2. A fruit sorting table comprising rollers arranged in spaced and parallel relation and forming between them runways for the fruit to be sorted, said rollers inclining downwardly from one end, means for simultaneously oscillating the rollers to move the fruit in the runways, and means for feeding fruit to the runways.

3. A fruit sorting table comprising rollers arranged in spaced and parallel relation and forming between them runways for fruit to be sorted, said rollers inclining downwardly from one end, means for simultaneously oscillating the rollers to move the fruit in the runways, the moving means for the rollers comprising a link connecting the rollers at one end to constrain them to move together, and a treadle connected with one of the rollers at the opposite end to oscillate the same when the treadle is elevated and depressed.

4. A fruit sorting table comprising rollers arranged in spaced and parallel relation and forming between them runways for the fruit to be sorted, said rollers inclining downwardly from one end, and means for simultaneously oscillating the rollers to move the fruit in the runways.

5. A fruit sorting table, comprising a pair of rollers arranged in spaced relation and approximately parallel and forming between them a runway for the fruit to be sorted, and means for oscillating the rollers to cause the fruit to feed down the runway.

FYNIS C. GORDON.

Witnesses:
GEO. SUSSEX, Jr.,
BAVUARD ELIOT.

Copies of this patent may be obtained for five cents each, by addressing the "Commissioner of Patents, Washington, D. C."